(12) United States Patent
Ougouag et al.

(10) Patent No.: US 6,804,320 B2
(45) Date of Patent: Oct. 12, 2004

(54) AUTOMATICALLY SCRAMMING NUCLEAR REACTOR SYSTEM

(75) Inventors: Abderrafi M. Ougouag, Idaho Falls, ID (US); Richard R. Schultz, Idaho Falls, ID (US); William K. Terry, Shelley, ID (US)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 125 days.

(21) Appl. No.: 10/121,421

(22) Filed: Apr. 12, 2002

(65) Prior Publication Data

US 2003/0194040 A1 Oct. 16, 2003

(51) Int. Cl.⁷ ............................................... G21C 7/16
(52) U.S. Cl. .................. 376/230; 376/231; 376/336; 376/381
(58) Field of Search .......................... 376/230, 231, 376/336, 337, 381, 380, 355

(56) References Cited

U.S. PATENT DOCUMENTS

| | | | | |
|---|---|---|---|---|
| 3,058,897 A | * | 10/1962 | Slack et al. .................. | 376/355 |
| 3,100,187 A | * | 8/1963 | Fraas .......................... | 376/381 |
| 3,123,532 A | * | 3/1964 | Michel ......................... | 376/381 |
| 3,228,847 A | * | 1/1966 | Parkinson et al. .......... | 376/231 |
| 3,284,309 A | * | 11/1966 | Murphree .................... | 376/355 |
| 3,287,910 A | * | 11/1966 | Silverstein ................... | 376/381 |
| 3,390,052 A | * | 6/1968 | McDaniels, Jr. ............. | 376/230 |
| 3,406,092 A | * | 10/1968 | Margen ....................... | 376/230 |
| 3,462,345 A | * | 8/1969 | Jabsen ........................ | 376/230 |
| 3,855,060 A | * | 12/1974 | Dietrich et al. ............. | 376/230 |
| 3,957,577 A | * | 5/1976 | Treshow ..................... | 376/230 |
| 4,076,583 A | * | 2/1978 | Ash et al. .................... | 376/230 |
| 4,158,602 A | * | 6/1979 | Minnick ...................... | 376/230 |
| 4,545,954 A | * | 10/1985 | Ullrich et al. ............... | 376/381 |
| 4,686,077 A | * | 8/1987 | Straub ......................... | 376/230 |
| 4,769,208 A | * | 9/1988 | Germer ....................... | 376/230 |
| 4,770,845 A | * | 9/1988 | Barrus et al. ............... | 376/230 |
| 4,789,519 A | * | 12/1988 | Schoening et al. .......... | 376/381 |

FOREIGN PATENT DOCUMENTS

| | | | | |
|---|---|---|---|---|
| GB | 969 089 | * | 9/1964 | ................ 376/230 |
| JP | 1082193 | * | 4/1986 | ................ 376/230 |
| JP | 1095278 | * | 5/1986 | ................ 376/336 |
| WO | 1052000 | * | 3/1959 | ................ 376/230 |
| WO | 1178526 | * | 9/1964 | ................ 376/231 |
| WO | 2047253 | * | 6/1971 | ................ 376/230 |

OTHER PUBLICATIONS

Fluidization and Fluid—Particle Systems, Zenz et al (editors), Reinhold Pub. Corp. New York, pp 41–44 1960.*

* cited by examiner

*Primary Examiner*—Harvey E. Behrend
(74) *Attorney, Agent, or Firm*—Dahl & Osterloth LLP

(57) ABSTRACT

An automatically scramming nuclear reactor system. One embodiment comprises a core having a coolant inlet end and a coolant outlet end. A cooling system operatively associated with the core provides coolant to the coolant inlet end and removes heated coolant from the coolant outlet end, thus maintaining a pressure differential therebetween during a normal operating condition of the nuclear reactor system. A guide tube is positioned within the core with a first end of the guide tube in fluid communication with the coolant inlet end of the core, and a second end of the guide tube in fluid communication with the coolant outlet end of the core. A control element is positioned within the guide tube and is movable therein between upper and lower positions, and automatically falls under the action of gravity to the lower position when the pressure differential drops below a safe pressure differential.

13 Claims, 4 Drawing Sheets

AUTOMATICALLY SCRAMMING NUCLEAR REACTOR SYSTEM

FIELD OF THE INVENTION

The invention generally pertains to nuclear reactor systems, and more specifically, to automatically scramming nuclear reactor systems.

BACKGROUND OF THE INVENTION

There are over four-hundred nuclear power plants worldwide, providing nearly twenty percent of the world's electricity. Nuclear power plants function much like power-generating plants that are fueled by coal or oil. That is, either type of power plant generates heat. The heat is used to heat water and produce steam, or to heat a gas. The steam or the gas, as the case may be, drives one or more turbines which in turn generate electricity. The difference, of course, is that heat is generated at a nuclear power plant by nuclear reactions (i.e., induced fission) instead of by burning coal or oil.

Induced fission takes place in the reactor. The fuel for the reactor is provided by a suitable radioactive material (e.g., uranium-235 or plutonium-239) typically formed into either rods or "pebbles" that are arranged within the core of the reactor. As the fuel fissions, neutrons are released which bombard the nuclei of the other fuel atoms in the core of the reactor. The bombarded nuclei absorb the neutrons causing the nuclei to become unstable and split, releasing one or more neutrons which bombard the nuclei of yet other fuel atoms, and so on. The split atoms release energy in the form of radiation and heat.

During operation of the reactor, a coolant is passed through the core of the reactor to maintain the reactor at a normal operating temperature and keep it from overheating. The coolant may be either a gas-phase coolant (e.g., helium) or a liquid-phase coolant (e.g., water) that flows into the reactor, absorbs the heat produced during induced fission, and flows out of the reactor.

The heated coolant that flows out of the reactor may then be passed through a heat-exchanger. Water is also provided to the heat exchanger to absorb heat from the heated coolant. The coolant is then recirculated into the reactor. The heat absorbed by the water produces steam. This steam is used to drive the turbines that operate the generator and generate electricity. Alternatively, in a direct cycle gas-cooled reactor the cooling fluid is used directly to drive the turbines.

In some circumstances, the flow of coolant into the reactor may be insufficient to cool the reactor. As an example, the flow of coolant into the reactor may be interrupted by a blockage in the pipe system or failure of a pump, reducing or altogether stopping the flow of coolant into the reactor. When this happens, the reactor must be shut down so that the reactor does not overheat.

The reactor is provided with one or more control elements that can be lowered into the reactor to slow and eventually stop the reactions occurring therein when the reactor exceeds a safe operating temperature. Control elements may be made from a variety of materials that absorb free neutrons. When the control elements are lowered into the reactor, the control elements absorb the neutrons instead of the neutrons being absorbed by the fuel, causing the reactor to shut down.

Typically, a number of monitors are used to determine how much heat is being generated in the reactor. For example, the monitors may measure the temperature in the reactor. When the temperature in the reactor exceeds safe operating conditions, the monitors signal an emergency response system which in turn lowers the control elements into the reactor to shut it down. For safety reasons redundant monitors are commonly provided so that if one fails, another of the monitors will still signal the emergency response system of the unsafe operating condition so that it can shut down the reactor. However, the monitors must still signal the emergency response system when the unsafe condition occurs, thereby introducing delay and another potential point of failure. In addition, such redundant monitors can be complex and therefore expensive.

SUMMARY OF THE INVENTION

An embodiment of an automatically scramming nuclear reactor system of the present invention may comprise a core having a coolant inlet end and a coolant outlet end. A cooling system operatively associated with the core provides coolant to the coolant inlet end of the core and removes heated coolant from the coolant outlet end of the core. The flow of coolant through the reactor maintains a pressure differential between the coolant inlet end of the core and the coolant outlet end of the core during a normal operating condition of the nuclear reactor system. A guide tube having a first end and a second end is positioned within the core. The first end of the guide tube is in fluid communication with the coolant inlet end of the core, and the second end of the guide tube is in fluid communication with the coolant outlet end of the core. A control element is positioned within the guide tube and is movable within the guide tube between an upper position and a lower position. The control element automatically falls under the action of gravity to the lower position when the pressure differential drops below a safe pressure differential.

A method for scramming a nuclear reactor system is also disclosed and may comprise the steps of providing a coolant to a core of the nuclear reactor system at a first pressure, removing heated coolant from the core of the nuclear reactor system at a second pressure, the first pressure being greater than the second pressure during a normal operating condition of the nuclear reactor system, using a pressure differential between the first and second pressures to hold a control element above a scramming position during the normal operating condition of the nuclear reactor system, and the control element automatically falling under the action of gravity to the scramming position when the pressure differential drops below a safe pressure differential.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
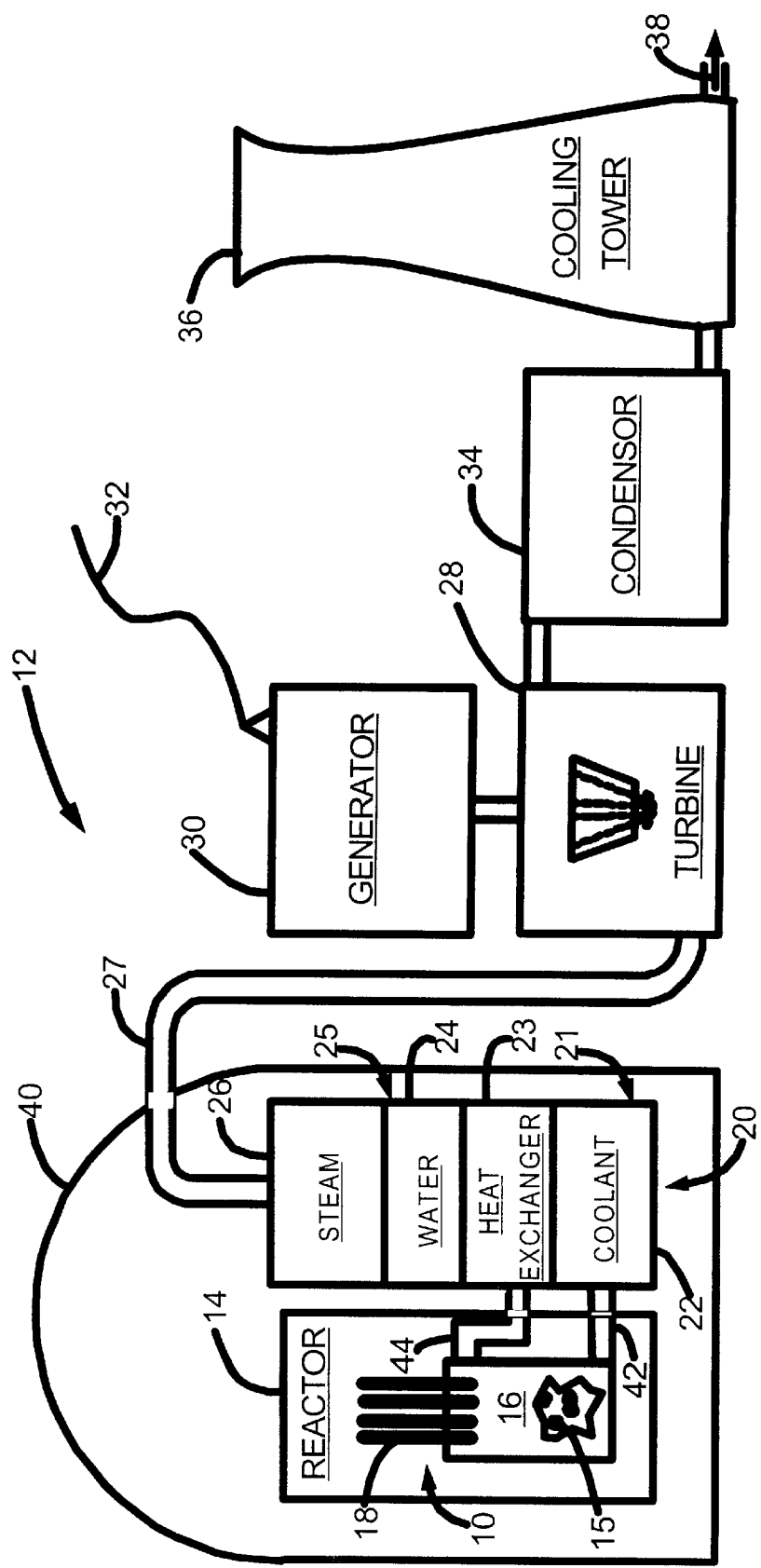
FIG. 1 is an illustration of a nuclear power plant.
Figure 2:
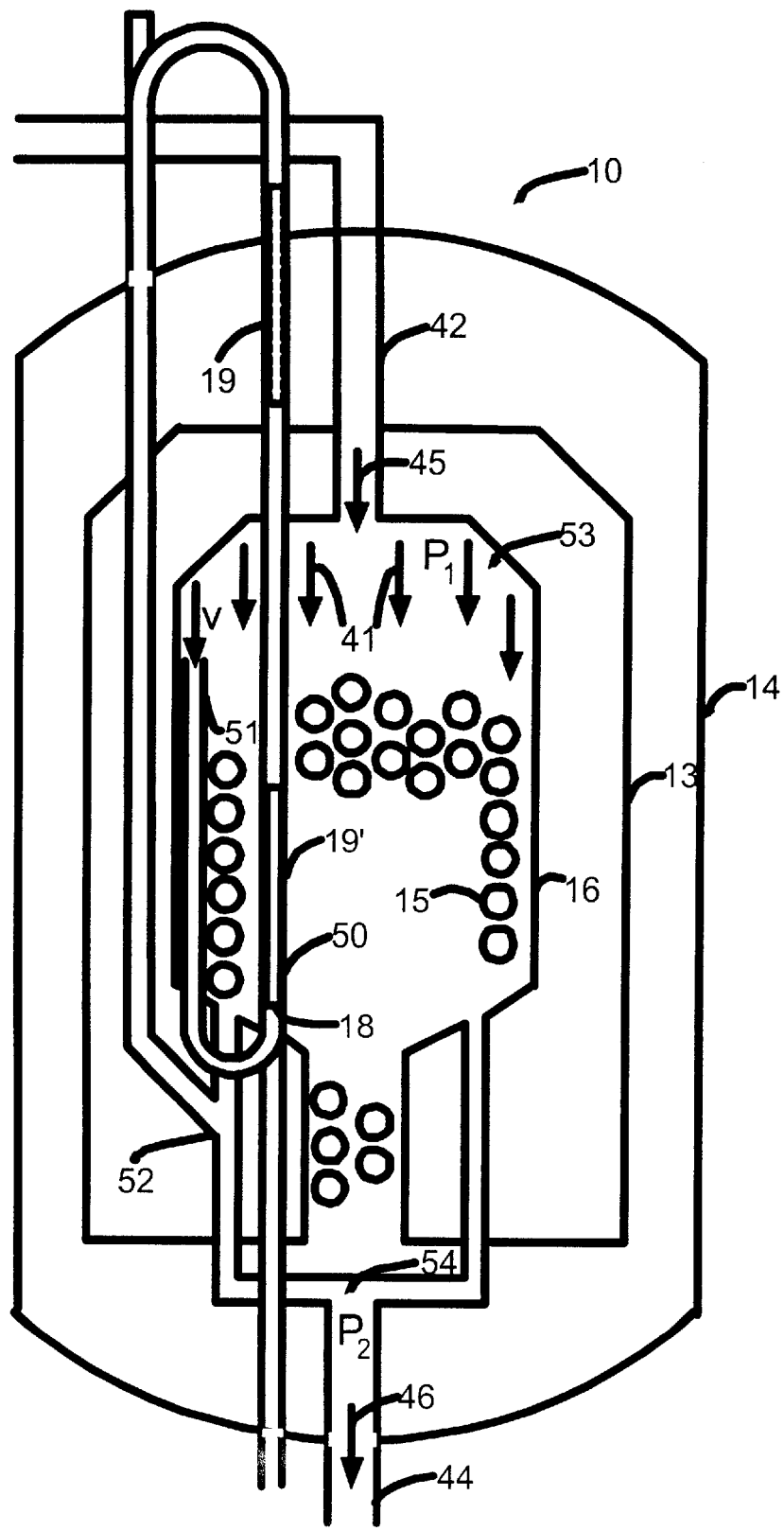
FIG. 2 is a cross-sectional view of one embodiment of an automatically scramming nuclear reactor system.

One embodiments of an automatic scramming system 10 according to the present invention is shown in FIG. 2 as it may be used in a nuclear power plant 12 (FIG. 1). Briefly, the nuclear power plant may be of conventional design (with the exception of the presence of the invention) and may involve a fission reactor 14 for producing heat. A coolant 22 is provided to the core 16 of the reactor 14 and absorbs the heat produced during induced fission. The heated coolant 22 flows out of the reactor 14 and is passed through a heat exchanger 23. Water 24 is also provided to the heat exchanger 23 and absorbs the heat from the heated coolant 22 to produce steam 26. The coolant 22 can then be recirculated through the reactor 14, and the steam 26 is used to drive one or more turbines 28, which operate a generator 30 to generate electricity 32. Of course in another embodiment, the coolant 22 may be used to drive the turbines 28 directly. In any event, if the flow of coolant 22 through the reactor 14 is insufficient to cool the core 16 of the reactor 14, however, the reactor 14 must be shut down before it overheats.

According to the teachings of the present invention, an automatically scramming nuclear reactor system 10 (FIG. 2) may comprise a core 16 having a coolant inlet end 42 and a coolant outlet end 44. A cooling system 20 (FIG. 1) operatively associated with the core 16 of the reactor 14 provides the coolant 22 to the inlet plenum 53 through the coolant inlet end 42 of the core 16. As the coolant 22 flows through the core 16 of the reactor 14, it absorbs heat. The cooling system 20 removes the heated coolant 22 from the outlet plenum 54 through the coolant outlet end 44 of the core 16, and maintains a pressure differential ($\Delta p$) between the coolant inlet end 42 of the core 16 and the coolant outlet end 44 of the core 16 during a normal operating condition of the nuclear reactor system 10. A guide tube 50 (FIG. 2) having a first end 51 and a second end 52 is positioned within the core 16 so that the first end 51 of the guide tube 50 is in fluid communication with the coolant inlet end 42 of the core 16, and the second end 52 of the guide tube 50 is in fluid communication with the coolant outlet 44 end of the core 16. A control element 18 is positioned within the guide tube 50 and is movable within the guide tube 50 between a lower position 19' and an upper position 19 under the influence of the pressure differential. That is, the control element 18 is raised to the upper position 19 when the flow of coolant 22 is sufficient to cool the core 16 of the reactor 14 (e.g., a safe pressure differential is established) so that induced fission occurs during normal operation. If the flow of coolant 22 is insufficient to maintain the reactor 14 at a safe operating temperature (e.g., the pressure differential drops below the safe pressure differential), the control element 18 automatically falls under the action of gravity to the lower position 19' and shuts down the reactor 14.

The automatically scramming nuclear reactor system 10 may be operated as follows according to the teachings of the invention. The cooling system 20 provides coolant 22 to the core 16 of the reactor 14 at a first pressure ($p_1$). The heated coolant 22 is then removed from the core 16 at a second pressure ($p_2$). The first pressure is greater than the second pressure during a normal operating condition of the nuclear reactor system 10. The control element 18 is held above a scramming position 19' (e.g., in position 19) during the normal operating condition of the nuclear reactor system 10 by the pressure differential ($\Delta p$) between the first pressure and the second pressure. When the pressure differential drops below a safe pressure differential, the control element 18 automatically falls under the action of gravity to the scramming position 19' to shut down the reactor.

Accordingly, the control elements 18 are raised from the reactor 14 under the force of the flow of coolant 22 when it is sufficient to maintain the reactor 14 at a safe operating condition. A mechanical lift system is not required to raise the control elements 18 from the core 16 to allow normal operation of the reactor 14. In addition, when the flow of coolant 22 is insufficient to maintain the reactor 14 at a safe operating temperature, the control elements 18 are automatically lowered into the core 16 of the reactor 14 under the force of gravity, causing the reactor 14 to shut down before it overheats. External monitors may be provided for additional safety, but are not required for operation of the automatically scramming nuclear reactor system 10 of the present invention.

Having briefly described one embodiment of an automatically scramming nuclear reactor system 10, as well as some of the more significant features and advantages thereof, various embodiments of the invention will now be described in detail.

A nuclear power plant 12 is illustrated in FIG. 1 in which the automatically scramming nuclear reactor system 10 (FIG. 2) of the present invention may be implemented. According to this embodiment, the nuclear power plant 12 comprises a reactor 14. Fuel 15 is provided in a core 16 of the reactor 14 where induced fission occurs during operation. A cooling system 20 provides coolant 22 (e.g., a gas such as helium or a liquid such as water) through a primary coolant loop (i.e., between a coolant reservoir 21 and the reactor 14). During operation, the coolant 22 is pumped from the coolant reservoir 21 into the inlet end 42 of the reactor 14. The coolant is returned from the outlet end 44 of the reactor 14 to a heat exchanger 23 that transfers the heat to water 24 in a secondary coolant loop (i.e., between a water reservoir 25 and the heat exchanger 23). The heated water 24 produces steam 26.

A steam collection system 27 provides a path for the steam from the water reservoir 25 to one or more steam-driven turbines 28. The turbines 28 are linked to a generator 30 which is operable by the rotation of the turbines 28 to generate electricity 32. Of course, in a direct-cycle system having a single loop, the coolant 22 directly drives one or more of the turbines 28.

A condenser 34 may be provided to collect the steam 26 from the turbines 28 and convert it to a liquid-phase. A return system (not shown) may provide a path to recirculate the liquid phase into the water reservoir 25 in a closed loop system. A cooling tower 36 may also be provided to cool the liquid-phase when it is to be discharged.

The reactor 14 and the cooling system 20 are preferably contained within a housing 40 to reduce the likelihood of radioactive gases or fluids leaking into the surrounding environment and to protect the reactor from external impacts (e.g., by vehicles or airplanes). The housing 40 may comprise a concrete liner surrounded by a steel containment vessel and an outer concrete building. Of course the housing 40 may comprise any suitable barriers based on various design considerations. The specific design is typically governed by safety and environmental regulations.

Various ancillary components (not shown) may also be contained within the housing 40, such as pumps, electronic controls, monitors, surveillance systems, etc. Such ancillary components are commonly associated with nuclear power plants 12, and therefore are not shown or described herein as they are well-understood and further description is not needed for an understanding of, or to practice the invention.

The nuclear power plant 12 may be operated to generate electricity 32 as follows. Radioactive material or fuel 15 (FIG. 2) is provided in the core 16 of the reactor 14 where it undergoes induced fission and releases heat. During the reaction, the coolant 22 flows through the core 16 of the reactor 14 to absorb heat from the reaction and maintain the reactor 14 at a normal operating temperature so that it does not overheat. The coolant 22 flows into the inlet end 42 of the reactor 14, absorbs heat in the core 16, and flows out through the outlet end 44 of the reactor 14. The heat absorbed by the coolant 22 is transferred to the water 24 by the heat-exchanger 23. The coolant is then recirculated into the reactor 14, and the heat absorbed by the water 24 produces steam 26.

The steam 26 is collected by the steam collection system 27 and used to drive the turbines 28, which in turn operate the generator 30 to generate electricity 32. The steam 26 is then collected from the turbines 28 by the condenser 34 and converted to a liquid phase. The liquid phase may be returned to the water reservoir 25 to enhance the efficiency of the nuclear power plant 12. Alternatively, the liquid phase may be passed through the cooling tower 36 and then discharged into the environment (e.g., as indicated by arrow 38).

The foregoing description of the nuclear power plant 12 is provided in order to better understand one environment in which the various embodiments of the automatic scramming system 10 of the present invention may be used. However, it should be understood that the automatic scramming system 10 of the present invention may be used in any of a wide range of other types of nuclear power plants 12 now known or that may be developed in the future. Consequently, the automatic scramming system 10 of the present invention should not be regarded as being limited to use with the nuclear power plant 12 shown and described herein. Also, since a more detailed description of the nuclear power plant 12 is not required to understand or practice the invention, the nuclear power plant 12 that the automatic scramming system 10 of the present invention may be used in conjunction with will not be described in further detail herein.

The reactor 14 is shown in more detail in FIG. 2. The reactor 14 may comprise a vessel 13 surrounding a core 16. The cooling system 20 provides coolant into an inlet plenum 53 of the core 16 through a coolant inlet end 42 and removes heated coolant from an outlet plenum 54 of the core 16 through a coolant outlet end 44 of the reactor 14. As previously discussed, the fuel 15 may comprise any suitable radioactive material and may be formed into "pebbles" and provided in the form of a "bed" within the core 16 of the reactor 14. Such a reactor is commonly referred to as a pebble-bed reactor.

For purposes of illustration, the reactor 14 may be patterned on the South African utility Eskom pebble-bed modular reactor (PBMR). Exemplary design parameters for such a reactor are given in Table 1.

TABLE 1

| | |
|---|---|
| Core height | 10 meters (m) |
| Core diameter | 3 m |
| Fuel | UO$_2$ |
| Reflector material | graphite |
| Reflector thickness | 1 m (all around) |
| Fuel packing fraction in core | 0.61 |

Also according to one exemplary embodiment, the fuel 15 may comprise TRISO-coated uranium oxide (UO$_2$) microspheres embedded in a spherical graphite matrix inside a shell of pure graphite. The "pebbles" 15 in this example are packed in the core 16 of the reactor 14 with a packing fraction of about 0.61, although this may vary in other designs.

It is noted that the fuel concentration may be adjusted to produce a critical core 16 when the control elements 18 are suspended above the reactor 14. It is further noted that the reactor 14 described in Table 1 is merely exemplary of one reactor that may utilize the automatic scramming system 10 of the present invention. Indeed, the invention is not limited to use with a pebble bed reactor and may be used with any suitable reactor, now known or that may be developed in the future. For example, the invention may be used with a prismatic core.

The cooling system 20 provides the coolant 22 into the inlet plenum 53 of the core 16 of the reactor 14 through an inlet end 42. For example, the coolant 22 may be provided into the reactor 14 in a downward flow, as illustrated by arrow 45 in FIG. 2. The coolant 22 flows through the core 16 of the reactor 14 in a downward direction as illustrated by arrows 41 and is exhausted from the outlet plenum 54 through an outlet 44 in the direction of arrow 46, as shown in FIG. 2.

One or more guide tubes 50 may also be provided in the vessel 13 of the reactor 14 in any suitable area of neutronic importance. In one embodiment, the guide tube 50 is positioned within the core 16 as shown in FIG. 2. However, other arrangements are also possible, where one or more of the guide tubes 50 are provided adjacent the core 16 (e.g., in the reflector region). According to one embodiment of the automatic scramming system 10, the guide tube 50 has a first end 51 and a second end 52. The first end 51 of the guide tube 50 is in fluid communication with the inlet plenum 53 (e.g., the inlet end 42 of the core 16), and the second end 52 of the guide tube 50 is in fluid communication with the outlet plenum 54 (e.g., the outlet end 44 of the core 16).

The guide tube 50 may be any suitable shape. In one embodiment, the guide tube 50 comprises one or more bends and is generally shaped as a "trombone" or a "paperclip", the reason for which will become apparent in the following discussion. In addition, the guide tube 50 may be made of any suitable material. In one embodiment, the guide tube 50 may be manufactured of stainless steel. However, other embodiments are also contemplated as being within the scope of the invention. Indeed, the particular design of the guide tube 50 may vary based on design considerations and is not to be limited to the particular embodiment shown and described here.

A control element 18 is positioned within each of the one or more guide tubes 50. The control element 18 is made of any suitable material that absorbs neutrons. Hence, when the control element 18 is lowered into the core 16 of the reactor 14, the control element 18 absorbs neutrons and slows the rate of reaction, eventually causing the reactor 14 to shut down.

According to one embodiment of the automatic scramming system 10, the control element 18 is movable within the guide tube 50 between an upper position 19 and a lower position 19'. When the control element 18 is raised into the upper position 19, the reaction proceeds therein. However, when the control element 18 is lowered into the lower position 19', the control element slows the rate of the reaction occurring therein and eventually shuts down the reactor 14.

The particular design of the control element 18 may vary according to the teachings of the invention as discussed in further detail below. Design parameters for one embodiment of the control element 18 are given in TABLE 2.

TABLE 2

| Design Parameter | Value |
| --- | --- |
| Control element material | boron carbide |
| Control element length | 1 m or 2 m |
| Control element diameter | 1 cm or 2.5 cm |
| Control element cladding material | stainless steel |
| Control element cladding thickness | 1 mm |

Of course the automatic scramming system 10 of the present invention may comprise any suitable number of control elements 18. In one embodiment there are four control elements, arranged in a circle having a radius of 75 cm. However, the particular configuration and arrangement of the control rod(s) 18 in the core 16 of the reactor 14 will depend on various design considerations, as will become apparent in the detailed discussion that follows.

Figure 3:
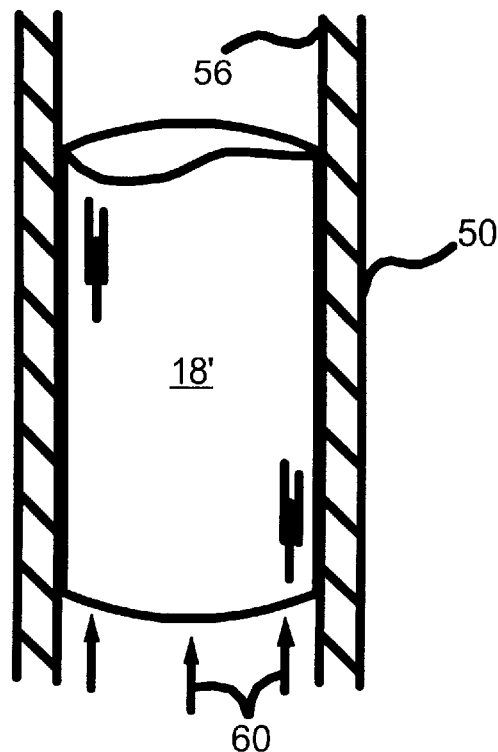
FIG. 3 is a side view of one embodiment of a control element for use with the automatically scramming nuclear reactor system.

According to one embodiment of the invention, the control element 18 may be a piston body 18' closely received within the guide tube 50, such as shown in FIG. 3. Little, if any coolant 22 flows around the piston body 18'. Where desired, any leakage around the piston body 18' may be further minimized by loose seals (not shown) provided between the piston body 18' and the walls 56 of the guide tube 50. Accordingly, the piston body 18' has a relatively high lift capacity because nearly all of the differential pressure between the inlet and outlet plena 53, 54 is available to raise it out of the core 16 of the reactor 14 (e.g., into position 19), as illustrated by arrows 60 in FIG. 3. When the pressure differential is less than the weight of the piston body 18', considering the influence of friction, which is minimal, the piston body 18' drops into the core 16 of the reactor 14 under the force of gravity (e.g., into position 19').

Figure 4:
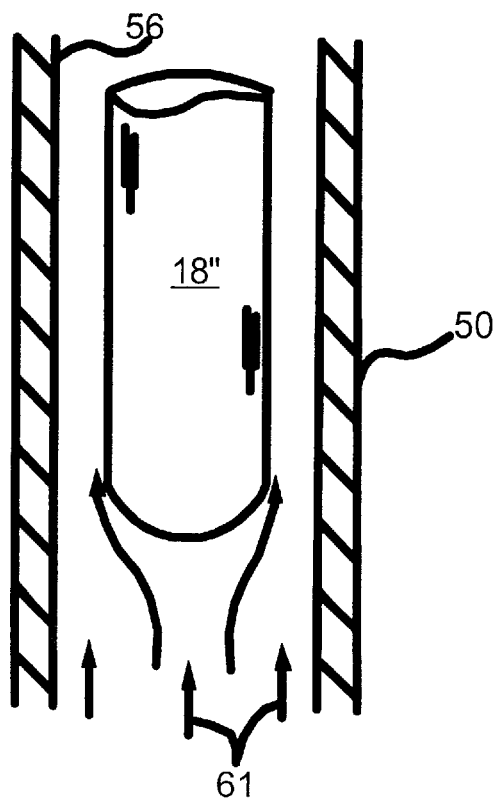
FIG. 4 is a side view of another embodiment of a control element for use with the automatically scramming nuclear reactor system.

According to another embodiment of the invention, the control element 18 may be an aerodynamic body 18" such as shown in FIG. 4. The aerodynamic body 18" is loosely received within the guide tube 50 and is lifted from the core 16 of the reactor 14 (e.g., into position 19) primarily by a dynamic pressure component of the bypass flow of coolant past the aerodynamic body. That is, the aerodynamic body 18" is lifted primarily by the drag force of the coolant moving through the guide tube 50 past the aerodynamic body 18", as illustrated by arrows 61 in FIG. 4. Again, the aerodynamic body 18" is lowered into the core 16 of the reactor 14 (e.g., into position 19') when the flow of coolant 22 decreases sufficiently for the weight of the control element to exceed the drag force of the flow of coolant 22.

The aerodynamic body 18" may be loosely received within the guide tube 50 with any suitable clearance therebetween. The particular design will be based on design considerations, such as will become apparent in the following discussion. As an example, however, the clearance between the perimeter of the piston body 18' and the inside of the guide tube 50 may be in the range of about 0.5 mm and 1.0 mm. The clearance between the perimeter of the aerodynamic body 18" and the inside of the guide tube 50 may be on the order of about 10%±1%. In one embodiment, the clearance is about 3.0 mm. Again, it is noted that these approximations are only provided for illustrative purposes.

Either embodiment of the control element 18 may be used with the automatic scramming system 10 according to the teachings of the invention. Although the piston body 18' may have a greater lift capacity than the aerodynamic body 18", the aerodynamic body 18" may drop more readily under the force of gravity when the coolant flow decreases, allowing for faster shut down of the reactor 14. In addition, the aerodynamic body 18" and has a lower probability of binding within the guide tube 50 than the piston body 18'.

It is noted that other suitable designs of the control element 18 are also possible and will become apparent to one skilled in the art after having become familiar with the teachings of the present invention. For example, the control element 18 may be shaped as a ball, a collection of balls, a cylinder, etc. As another example, the aerodynamic body 18" may be provided with fins or shallow channels on the side. The fins or shallow channels may be designed to cause the control element 18 to slowly spin, reducing the tendency to vibrate in the guide tube 50.

The control element(s) 18 are designed with sufficient shutdown reactivity. That is, the control elements 18 are designed to absorb enough neutrons when lowered into the core 16 that the reaction slows and eventually stops, shutting down the reactor 14. The change in reactivity resulting from insertion of the control elements 18 into the core may be modeled, as shown in Table 3 for three combinations of control element length and diameter.

TABLE 3

| | Design 1 | Design 2 | Design 3 |
| --- | --- | --- | --- |
| Control element length (m) | 1.0 | 1.0 | 2.0 |
| Control element diameter (cm) | 1.0 | 2.5 | 2.5 |
| Control element mass (kg) | 0.244 | 1.82 | 3.64 |
| $k_{eff}$ (withdrawn) | 1.00441 | 0.98793 | 0.98793 |
| $k_{eff}$ (inserted) | 0.99940 | 0.97252 | 0.96452 |
| Reactivity (4 elements) ($) | 0.244 | 1.8 | 3.6 |

The results presented in Table 3 indicate that Design 1 may be insufficient for a secure reactor scram, but may be sufficient to maintain the reactor in a shutdown state. After the core 16 of the reactor 14 cools following shutdown, the inserted control elements 18 would prevent re-criticality. Even Design 2 provides marginal scram reactivity. However, Design 3 provides ample shutdown reactivity with control elements 18 that can be supported by the available lift force. Of course it is understood the values presented in Table 3 are merely exemplary of the shutdown reactivity of the control elements 18, and that the shutdown reactivity of the control elements 18 may be determined for any of a variety of different designs of the control elements 18.

Operation of the automatic scramming system 10 is as follows. The cooling system 20 provides coolant 22 to the inlet plenum 53 through the inlet end 42 of the core 16 and removes heated coolant 22 from the outlet plenum 54 through the outlet end 44 of the core 16. Accordingly, the flow of coolant 22 through the reactor 14 maintains a pressure differential between the coolant inlet end 42 of the core 16 and the coolant outlet end 44 of the core 16 (i.e., between the inlet and outlet plena 53, 54) during a normal operating condition of the nuclear reactor system 10. This pressure differential may be used to raise and lower the control element(s) 18 in the guide tube 50.

More specifically, the coolant 22 enters the pebble bed in the core 16 of the reactor 14 from the inlet plenum 53, then the coolant 22 accelerates and turns numerous times as it moves through the packed pebble bed, and finally slows down as it moves into the outlet plenum 54. As such, the flow of coolant 22 through the pebble bed sustains a pressure drop ($\Delta p$) between the pressure in the inlet plenum ($p_1$) and the pressure in the outlet plenum ($p_2$) during normal operation. For helium in a reactor 14 such as previously described, this pressure drop is in the range of about 110 to 203 kilo-Pascals (kPa). The differential pressure in the core 16 of the reactor 14 causes the control element 18 to be lifted as a fraction of the coolant 22 enters the open end 51 of the guide tube 50 in the inlet plenum 53.

Also according to the teachings of the invention, the control element 18 automatically falls under the action of gravity to the lower position 19' when the pressure differential drops below a safe pressure differential. For example, the control element 18 falls into the core 16 of the reactor 14 (e.g., position 19') when the pressure within the core 16 drops below that necessary for effective cooling of the reactor 14. Similarly, the control element 18 falls into the core 16 of the reactor 14 when the flow rate of the coolant 22 drops below that necessary for effective cooling of the reactor 14.

The control element 18 drops if the core 16 experiences a loss of forced cooling (either with or without depressurization). For example, where the cooling blowers fail or are turned off, or the coolant path becomes obstructed. In such an event, the pressure differential between the inlet and outlet plena 53, 54 is negligible and the control element 18 drops into the core 16 of the reactor 14. As the core 16 depressurizes, the control element 18 drops into a portion of the guide tube 50 that is surrounded by reactor core (e.g., position 19') as soon as the flow of coolant 22 decreases below a limiting or minimum value at which the lifting force balances the gravitational force.

The force ($F_L$) required to lift the control element 18 must exceed the gravitational force ($F_g$) to raise it out of the core 16 of the reactor 14. The available lift for the piston body 18' is a function of the projected surface area (i.e., the static pressure component), as nearly the entire pressure differential is available to act on the control element 18'. As an example, a diameter of 2.5 cm is sufficient to lift and support a 10 kg piston configuration control element with a pressure differential of 203 kPa.

The following illustrates calculations that can be used to optimize the design of an aerodynamic body 18" so that the lifting force exceeds the gravitational force under normal operating conditions. First, the drag force ($F_d$) required to lift the aerodynamic body 18" (e.g., from position 19' to position 19) may be determined as follows:

$$F_d = \frac{1}{2} C_d A_x \rho v^2 \quad (1)$$

where:

v is the gas velocity past the control element;

ρ is the coolant density at flow conditions;

$A_x$ is the cross section area of the rod; and $C_d$ is the drag coefficient.

In the above equation (1), $\rho v^2$ is the dynamic pressure component. Equation (1) may be solved for the velocity as follows:

$$v = \sqrt{\frac{2 F_d}{\rho C_d A_x}} \quad (2)$$

Accordingly, equation (2) can be solved to determine the gas velocity that is required past the aerodynamic body 18".

The coolant pressure drop due to friction ($\Delta p_f$) in the guide tube 50 can be determined as follows:

$$\Delta p_f = \frac{1}{2} \rho v^2 \left[ f \frac{L}{D_{ann}} + K \right] \quad (3)$$

where:

f is the Moody friction factor;

L is the length of the control element;

$D_{ann}$ is the effective diameter of the annular gap between the control element 18" and the guide tube 50; and K is the sum of the entrance and exit losses.

Thus, the available drag force can be estimated as follows. Using equation (3), the flow velocity in the gap around the control element can be expressed as a function of the total available pressure drop across the core ($\Delta p_c$) using equation (1) and replacing $\Delta p_f$ with $\Delta p_c$. The maximum available drag force is obtained by using flow velocity in equation (1) as follows:

$$F_d = \frac{C_d A_x}{\left[ f \frac{L}{D_{ann}} + K \right]} \Delta p_c \quad (4)$$

Acceleration or deceleration along the guide tube 50 due to heating or cooling in the lower and upper flow regions of the guide tube 50, respectively, may be ignored as they roughly cancel one another. Therefore, equation (4) may be used to determine the maximum drag available under normal operating conditions.

In some circumstances, it may be desirable to operate the reactor 14 at reduced power. When the reactor 14 is operated at a reduced power, the flow rate of the coolant 22 through the core 16 is decreased to maintain an optimum operating temperature. Of course, decreasing the coolant flow also decreases the available pressure differential across the core 16 of the reactor, and therefore reduces the lifting force available to raise the aerodynamic body 18".

The minimum drag force to lift a given aerodynamic body 18" can be determined as follows. Using equation (3) and the requirement that essentially all the power generated in the core 16 is carried away by the flow of coolant 22, the frictional pressure drop may be expressed as a function of the power (P) as follows:

$$P = m c_p \Delta T \quad (5)$$

where:

$c_p$ is the heat capacity of the coolant; and $\Delta T$ is the temperature change of the coolant as it traverses the core; and m is the mass flow rate m.

The mass flow rate (m) may be determined as follows:

$$m = \rho v A \quad (6)$$

where:

A is the total effective flow path cross section area.

Therefore, the flow velocity (v) can be expressed as a function of the power (P). That expression is then squared and used to replace $v^2$ in equation (3) as follows:

$$\Delta p_f = \frac{1}{2} \left[ \frac{f \frac{L}{D_{ann}} + K}{\rho A^2 c_p^2 (\Delta T)^2} \right] P^2 \quad (7)$$

When the reactor 14 is operated at a power less than a limiting value, the control element 18" drops into the core 16 and shuts the reactor 16. An estimate of the limiting power can be determined as follows. The minimum coolant velocity to maintain the control element 18" out of the core can be determined from equation (2) with the drag force equated to the weight of the rod. The drag pressure drop can be calculated using equation (3). Finally, using equation (7), it is determined that this pressure drop corresponds to a percentage of the full operating power. When the power drops below this percentage of full power, the control elements lower into the core 16 of the reactor to shut it down.

The aerodynamic control element 18" may also be designed based on the time of descent into the core 16 of the reactor 14. To simplify this discussion, assume that the control element 18" remains suspended in the raised position 19 until depressurization is complete, and then it starts to drop into the lower position 19'. The following equation can then be used to determine the time of descent of the control element 18" into the core 16.

$$M \frac{d^2 x}{dt^2} = Mg - \frac{1}{2} C_d A_x \rho v^2 \quad (8)$$

where:
M is the mass of the control element;
x is position; and
t is time.

Preferably, the aerodynamic control element 18" is designed so that it drops well in advance of what is required to hold down the reactivity in the core 16 of the reactor 14.

It is readily apparent that there are various design considerations that will affect the performance of the automatically scramming nuclear reactor system 10 of the present invention. These design considerations may include the position of the guide tube(s) 50 in the core 16 of the reactor 14 to target areas of greater neutronic importance. Other design considerations may include any of a number of factors that may be varied to optimize the configuration of the control element(s) 18 and/or guide tube(s) 50 to provide more or less lift. For example, the lift can be increased considerably with only small changes in the diameter of the control element 18. A larger cross section provides more surface area for the lift force. A larger cross section may allow operation at a lower fraction of the maximum power, but the control element 18 may weigh more. Of course in another embodiment, the control element 18 may be made with a hollow central region so as to weigh less. Yet other design parameters will become readily apparent to one skilled in the art after having become familiar with the teachings of the present invention.

Figure 5:
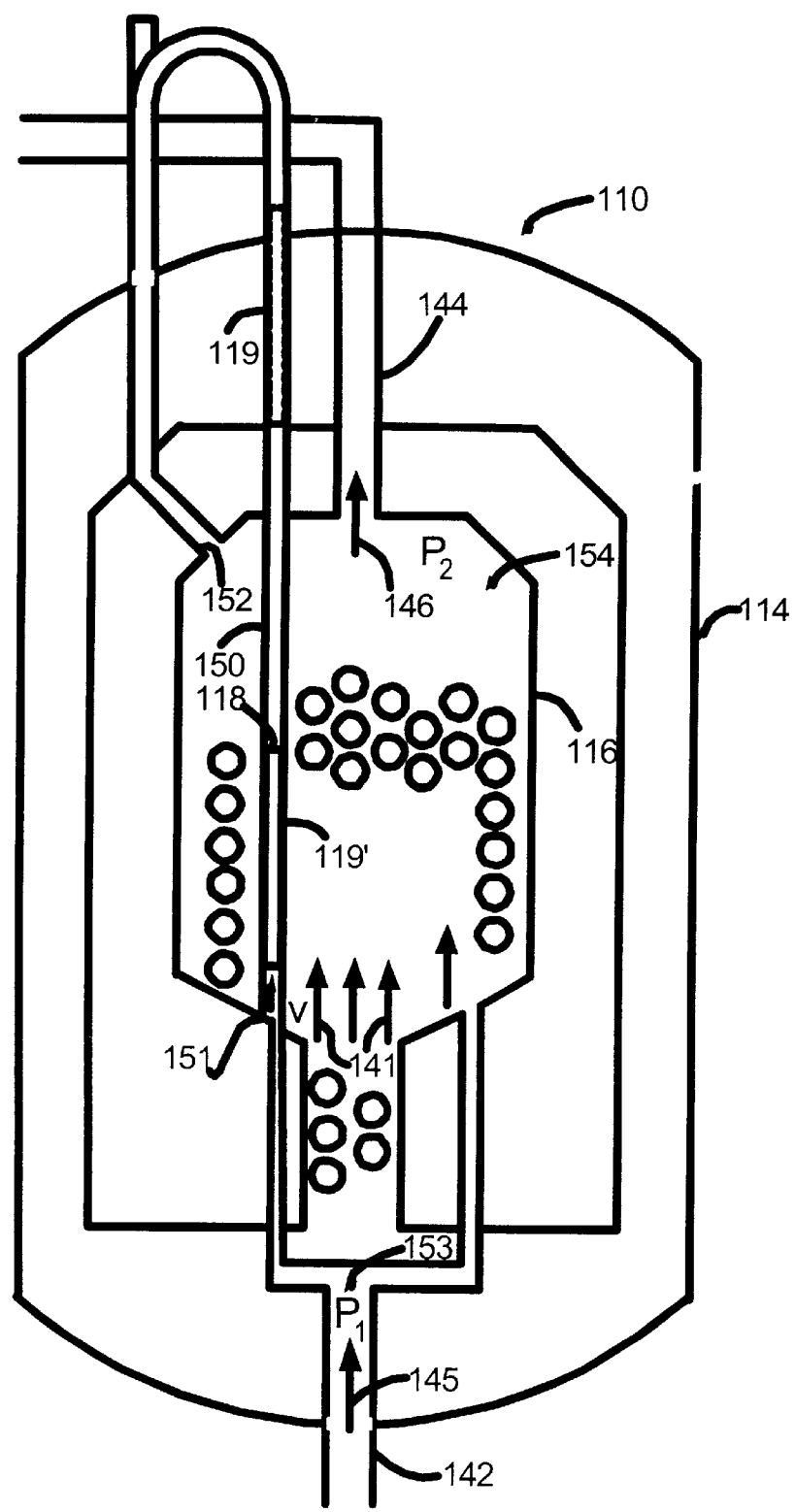
FIG. 5 is a cross-sectional view of another embodiment of an automatically scramming nuclear reactor system.

An alternative embodiment of the automatic scramming nuclear reactor system 110 is shown in FIG. 5. According to this embodiment, the coolant 22 may be provided into the reactor 114 in an upward flow. That is, the coolant 22 is provided into the inlet plenum 153 through the inlet end 142 of the reactor 114 in the direction of arrow 145. The coolant 22 flows through the core 116 of the reactor 114 in an upward direction as illustrated by arrows 141. The heated coolant 22 is then exhausted from the outlet plenum 154 through an outlet end 144 of the reactor 114 in the direction of arrow 146.

According to this embodiment, the guide tube 150 is positioned in the core 116 of the reactor 114 so that it is open on one end 151 to the inlet plenum 153 and on the other end 152 to the outlet plenum 154. The pressure differential established between the inlet and outlet plena 153, 154 causes the control rod 118 to rise in the guide tube 150 (e.g., to position 119) during a normal operating condition. When the flow is insufficient to cool the core 116 of the reactor 114, the control rod 118 drops under the influence of gravity into the core 116 (e.g., to position 119') and shuts down the reactor 114.

Of course, it is understood that other embodiments of the automatic scramming nuclear reactor system 110 are also possible. For example, either the piston body 18' or the aerodynamic body 18" described above may be used with the automatic scramming nuclear reactor system 110 of the present invention.

It is readily apparent that according to embodiments of the invention the automatic scramming system 10 responds to changes in the flow of coolant 22 to raise and lower the control elements 18 in the reactor 14. Furthermore, the control elements 18 are lowered into the reactor 14 under the force of gravity to automatically shut down the reactor 14 before it can overheat. Consequently, the claimed invention represents an important development in the field of nuclear power generation.

Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

What is claimed is:

1. An automatically scramming nuclear reactor system, comprising:
   a core, said core having a coolant inlet end and a coolant outlet end, the coolant inlet end being located at a position above the coolant outlet end;
   a cooling system operatively associated with said core, said cooling system providing coolant to the coolant inlet end of said core and removing heated coolant from the coolant outlet end of said core, said cooling system maintaining a pressure differential between the coolant inlet end of said core and the coolant outlet end of said core during a normal operating condition of said nuclear reactor system;
   a guide tube positioned within said core, said guide tube comprising:
      an elongated inlet section having a proximal end and a distal end, the proximal end of the inlet section defining a first end of said guide tube, the first end of said guide tube being in fluid communication with the coolant inlet end of said core;
      an substantially straight control element section extending generally upwardly through said core, the control element section having a proximal end and a distal end;
      a first U-shaped section fluidically connecting the distal end of the inlet section and the proximal end of the control element section;
      an elongated outlet section having a proximal end and a distal end, the distal end of the outlet section defining a second end of said guide tube, the second end of said guide tube being in fluid communication with the outlet end of said core; and a second U-shaped section fluidically connecting the distal end of the control element section and the proximal end of the outlet section; and a control element positioned within the control element section of said guide tube, said control element being movable within the control element section of said guide tube between an upper position and a lower position, the control element automatically falling under the action of gravity to the lower position when the pressure differential drops below a safe pressure differential.

2. The nuclear reactor system of claim 1, wherein said guide tube comprises a shape selected from the group consisting of trombone-shaped and paperclip-shaped.

3. The nuclear reactor system of claim 1, wherein said coolant comprises a gas.

4. The nuclear reactor system of claim 1, wherein said core is selected from the group consisting of a pebble bed, and a prismatic core.

5. The nuclear reactor system of claim 1, wherein said control element comprises a piston body, said piston body being closely received within the control element section of said guide tube, said piston body being held above the lower position within the control element section of said guide tube primarily by a static pressure component of the pressure differential.

6. The nuclear reactor system of claim 1, wherein said control element comprises an aerodynamic body, said aerodynamic body being loosely received within said guide tube, said aerodynamic body being lifted above the lower position within said guide tube primarily by a dynamic pressure component of a bypass flow of coolant in said guide tube.

7. An automatically scramming nuclear reactor system, comprising:

a vessel defining an inlet plenum and an outlet plenum, the inlet plenum being located above the outlet plenum;

a cooling system operatively associated with said nuclear reactor system, said cooling system providing a coolant to the inlet plenum and removing heated coolant from the outlet plenum, said cooling system maintaining a pressure differential between the inlet plenum and the outlet plenum during a normal operating condition of said nuclear reactor system;

a guide tube positioned within said vessel, said guide tube comprising:

an elongated inlet section having a proximal end and a distal end, the proximal end of the inlet section defining a first end of said guide tube, the first end of said guide tube being in fluid communication with the inlet plenum of said vessel;

an substantially straight control element section extending generally upwardly through said vessel, the control element section having a proximal end and a distal end;

a first U-shaped section fluidically connecting the distal end of the inlet section and the proximal end of the control element section;

an elongated outlet section having a proximal end and a distal end, the distal end of the outlet section defining a second end of said guide tube, the second end of said guide tube being in fluid communication with the outlet plenum of said vessel; and a second U-shaped section fluidically connecting the distal end of the control element section and the proximal end of the outlet section; and a control element positioned within the control element section of said guide tube, said control element being movable within the control element section of said guide tube between an upper position and a lower position, said control element automatically falling under the action of gravity to the lower position when the pressure differential drops below a safe pressure differential.

8. The nuclear reactor system of claim 7, wherein said guide tube comprises a shape selected from the group consisting of trombone-shaped and paperclip-shaped.

9. The nuclear reactor system of claim 7, wherein said coolant comprises a gas.

10. The nuclear reactor system of claim 7, wherein said vessel comprises a core having a pebble bed.

11. The nuclear reactor system of claim 7, wherein said control element is closely received within the control element section of said guide tube, said control element being held above the lower position within the control element section of said guide tube primarily by a static pressure component of the pressure differential.

12. The nuclear reactor system of claim 7, wherein said control element is loosely received within said guide tube, said control element being lifted above the lower position within said guide tube primarily by a dynamic pressure component of a bypass flow of coolant in said guide tybe.

13. An automatically scramming nuclear reactor system, comprising:

a core;

an inlet plenum adjacent said core;

an outlet plenum adjacent said core, said outlet plenum being located below said inlet plenum;

cooling means operatively associated with said core for providing coolant to the inlet plenum adjacent said core, for removing heated coolant from the outlet plenum adjacent said core, and for maintaining a pressure differential between the inlet plenum and the outlet plenum during a normal operating condition of said nuclear reactor system;

control element means for scramming said core when said control element means is lowered to a scramming position;

a guide tube said guide tube comprising:

an elongated inlet section having a proximal end and a distal end, the proximal end of the inlet section defining a first end of said guide tube, the first end of said guide tube being in fluid communication with the coolant inlet plenum adjacent said core;

an substantially straight control element section extending generally upwardly through said core, the control element section having a proximal end and a distal end;

a first U-shaped section fluidically connecting the distal end of the inlet section and the proximal end of the control element section;

an elongated outlet section having a proximal end and a distal end, the distal end of the outlet section defining a second end of said guide tube, the second end of said guide tube being in fluid communication with the outlet plenum adjacent said core; and a second U-shaped section fluidically connecting the distal end of the control element section and the proximal end of the outlet section.

* * * * *